United States Patent

[11] 3,613,605

| [72] | Inventor | Ernest C. Holdredge, Jr. |
| | | Decatur, Ga. |
| [21] | Appl. No. | 12,812 |
| [22] | Filed | Feb. 1, 1970 |
| [45] | Patented | Oct. 19, 1971 |
| [73] | Assignee | Allastics, Inc. |
| | | Norcross, Ga. |

[54] FOUR-WAY, DOUBLE-FACE GENERAL PURPOSE PALLET
9 Claims, 4 Drawing Figs.

[52] U.S. Cl. ................................................. 108/58, 108/51
[51] Int. Cl. .................................................. B65d 19/18
[50] Field of Search .......................................... 108/51–58

[56] References Cited
UNITED STATES PATENTS

| 3,187,691 | 6/1965 | Leitzel | 108/58 |
| 3,187,689 | 6/1965 | Hess | 108/58 |
| 3,307,504 | 3/1967 | Cloyd, et al | 108/58 |
| 3,330,228 | 7/1967 | Donnelly | 108/51 |
| 3,404,642 | 10/1968 | Belcher et al | 108/51 |
| 3,424,110 | 1/1969 | Toot | 108/53 |
| 3,467,032 | 9/1969 | Rowlands et al | 108/58 |
| 3,481,285 | 12/1969 | Yellin | 108/58 |
| 3,511,191 | 5/1970 | Barry, Jr. et al. | 108/58 |

Primary Examiner—Francis K. Zugel
Assistant Examiner—Glenn O. Finch
Attorney—Jones and Thomas ABSTRACT: A four-way, double-face general purpose pallet having sidewalls which are sufficiently thin so that they are not capable of and in fact do not offer a practical resisting moment to the termination of a top deck member by virtue of the walls' thickness. The resisting moment is provided by joining opposed sidewalls together through a series of tensile bottom deck members. The pallet is preferably prepared in a single, integral structural form from a foamed plastic material. Internal, structural supports provide inflexible areas for static support so that multiple loaded or unloaded pallets may be stacked upon one another.

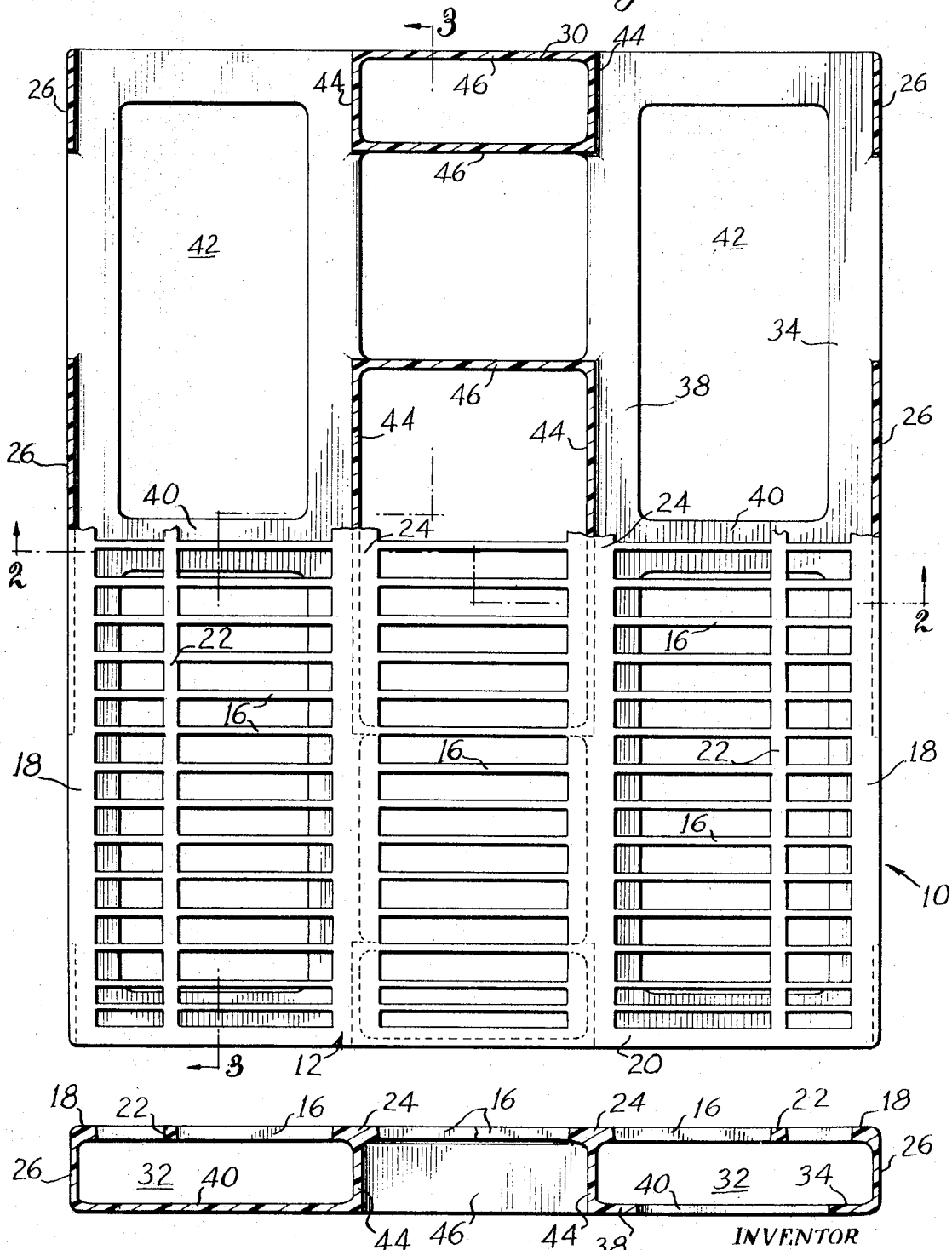

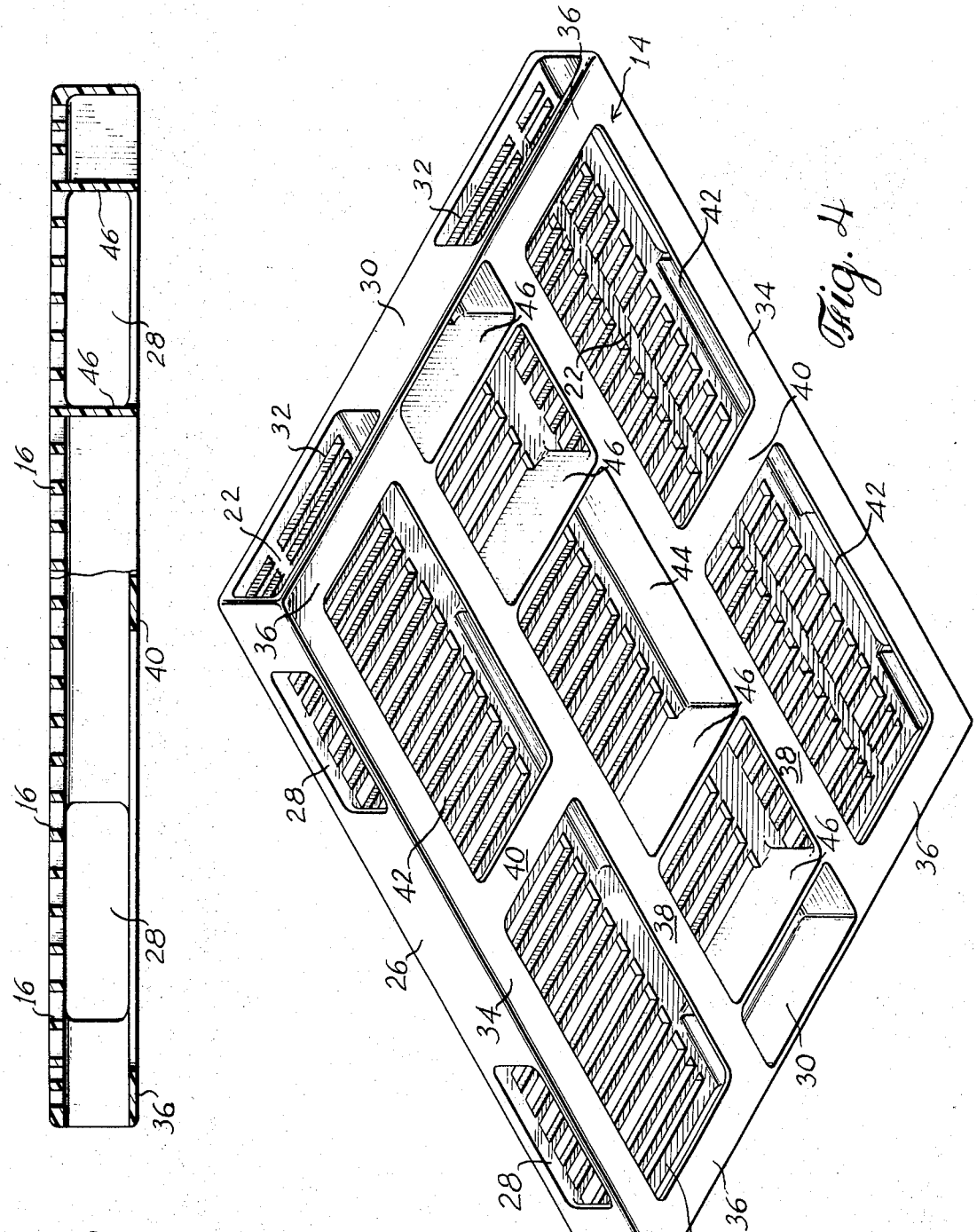

FOUR-WAY, DOUBLE-FACE GENERAL PURPOSE PALLET

DISCLOSURE

The present invention relates to four-way, double-face general purpose pallets which are preferably formed from a foamed plastic material, and particularly, but not exclusively, to pallets for handling by fork lift vehicles and pallet jacks. The term "pallet" is used in this application to mean a relatively shallow support structure, usually rectangular, having an upper surface upon which crates, boxes, cans, bricks and other articles may be accommodated for convenient handling and transport. The term "four-way" refers to pallets which permit entry by forks or other handling and transporting equipment on all four sides. The term "double-face" refers to pallets which have both top and bottom decks. Double-face pallets generally are of two different designs: reversible, having identical top and bottom decks upon which goods may be stacked; and nonreversible, having top and bottom decks with different designs, and upon which goods may be stacked only upon the top deck.

In the past pallets have conventionally been prepared from wood and plastic material. Wooden pallets have suffered from poor construction and short life together with undesirably expensive costs of construction as well as excessive weight. Previous plastic pallets, while solving some of the more pressing problems of wooden pallets, have created new and more serious problems. Present plastic pallets, as a class, seem to be deficient in certain qualities of dimensional stability, cost or weight. If the plastic pallets lack dimensional stability and strength, it is substantially unsuitable for most uses and only creates problems rather than providing a solution. In some attempts to increase the strength and stability, pallets have been produced with excessive weight and extreme cost which also serve to create additional problems of handling and replacement.

It is an object of the present invention to provide a general purpose pallet which is both strong and stable in all dimensions while also being relatively light in weight and inexpensive in cost. This and other objects, features and advantages of the present invention will become apparent from a review of the following detailed description taken in conjunction with the accompanying drawings wherein:

FIG. 1 is a top plan view of the pallet showing certain parts broken away and some parts in cross section;

FIG. 2 is a cross-sectional view taken along line 2—2 of FIG. 1;

FIG. 3 is a cross-sectional view taken along line 3—3 of FIG. 1;

FIG. 4 is a bottom perspective view of the pallet.

With reference to the drawings of this application, the four-way, double-face general purpose pallet 10 of the present invention generally comprises a top deck 12, a bottom deck 14 and internal structural supports. The top deck 12 defines one face of the pallet and is generally the deck upon which crates, boxes, cans and bricks and other articles are accommodated. The bottom deck 14 defines the second face of the pallet and is generally the deck which is placed upon the accommodated articles of another pallet or a basic support structure such as a floor. It should be understood that the drawings of the present application disclose a nonreversible double-face pallet wherein goods are stackable only upon the top deck. However, it is within the scope of the present invention to provide a reversible pallet wherein the structural configuration of the bottom deck is substantially identical to the top deck. For the purposes of this application, though, the invention will be disclosed and explained in terms of a nonreversible double-face pallet.

The general purpose pallet shown in the drawings is integrally molded from plastic material in one-piece construction. While this method of construction is preferred, it should be understood that the pallet may be assembled from separately formed or constructed parts and joined together, for example by welding or by an adhesive. In addition it should be understood that the pallet may be cast from metal or constructed from wooden or metal parts, employing appropriate joining means for each construction material. The preferred method of integral construction through one-piece molding will be discussed in greater detail in a later portion of this application. For the purpose of this application the pallet will be disclosed and explained in terms of a unitary, integral pallet structure.

The top deck 12 of the present pallet lies within a substantially horizontal plane and includes horizontal top deck members, such as ribs 16 which are substantially evenly spaced apart across the top deck and provide the major portion of the stacking surface area. The top deck ribs are substantially rectangular or trapezoidal in cross section and are integrally joined at their outside edges to a pair of opposed top deck stringers 18. Opposed top end ribs 20 (only one shown) join opposed ends of stringers 18 to form a rigid support periphery for the top deck ribs. Inwardly of the stringers 18 are a pair of top deck cross braces 22 which are integrally formed with the ribs and are positioned between the ribs substantially parallel to and spaced from the stringers 18. Interiorly of the cross braces 22 are top deck restrainer plates 24. Plates 24 are integrally formed with the ribs substantially parallel to and spaced from the cross braces 22. It should be understood that ribs 16, stringers 18, end ribs 20, cross braces 22 and restrainer plates 24 all lie within the same horizontal plane and present one substantially flat surface for accommodation of goods and articles.

The present pallet further includes opposite sidewalls 26 which lie within substantially parallel planes which are in turn substantially vertical and normal to the plane of the top deck. The sidewalls are integrally joined along their upper edge to the outside edges of stringer 18. Sidewalls 26 define two side passages 28 in each wall which permit the insertion of conventional forks or other appropriate equipment for handling and transporting the pallet. The side passages 28 are spaced apart and generally register with the side passages defined in the opposite sidewall. The end edges of sidewalls 26 are integrally joined to end walls 30 which lie within substantially parallel planes which are in turn substantially vertical and normal to the top deck and the sidewalls. These end walls are also integrally joined along their top edges to the end edges of top end ribs 20. End walls 30 define two end passages 32 in each wall which permit the insertion of conventional forks or other appropriate equipment for handling and transporting the pallet. End passages are defined within the outermost areas of the end walls 30 and generally register with the end passages defined within the opposed end wall.

The bottom deck 14 of the present invention lies within a substantially horizontal plane which is parallel to the plane of the top deck and defines a substantially flat lower face consisting of side and end lower stringers 34 and 36 respectively, intermediate deck plates 38 running parallel to side stringers 34 and 36 and spaced inwardly therefrom, and spanner plates 40 running perpendicularly between adjacent stringers and deck plates. These structural members essentially define two pair of adjacent openings 42. These openings are defined in the bottom deck in order to save weight and material in the pallet while providing a sufficiently strong and useable lower surface. The lower stringers 34 and 36 are integrally joined along their outside edges to the bottom edges of sidewalls 26 and end walls 30 respectively. It should be understood that side and end lower stringers 34 and 36, intermediate deck plates 38 and spanner plates 40 all lie within the same horizontal plane and present one substantially flat surface for support of the pallet.

An additional series of openings is defined within the lower deck between the pairs of openings 42. This additional series of openings is delimited for the most part by the internal structural supports of the pallet. These supports include a pair of center struts 44 which lie in substantially parallel planes which are in turn substantially vertical and normal to the top and bottom decks and parallel to sidewalls 26. The struts have openings defined therein to register interiorly with side passages 28 and the upper edges of the struts 44 are integrally joined to the lower surfaces of restrainer plates 24 of the top deck. The lower edges of the struts are integrally joined to the inside edges of intermediate deck plates 38 of the bottom deck. Four spacer plates 46 are positioned between the center struts and lie within planes which are substantially parallel to one another and vertical and normal with respect to the top and bottom decks and the center struts. The spacer plates are integrally joined to the center struts along adjacent edges. These spacer plates serve to establish areas of static support for the pallet along the central backbone of the pallet. They also define registering passages for forks or other equipment which are inserted into the side passages of the pallet. The combination of the spacer plates 46 and center struts 44 contributes compression stability to the upper and lower decks and dimensional stability to the pallet as a whole.

It has been found that the thickness of the elements of the pallet should range between about three-sixteenths of an inch to about 1 inch and a preferred range of thickness for elements is one-fourth of an inch to one-half of an inch. In the most preferred form of the invention all the elements have substantially the same thickness which should be about five-sixteenths of an inch to about three-eighths of an inch. It should be understood, with respect to the most preferred embodiment, that in corners and at joints the thickness will be increased over the thickness of the adjacent or joined members.

One of the more interesting aspects of the present invention concerns the fact that it is possible to design into the present pallet a certain destruction limit so that the pallet is capable of accommodating only a specific maximum weight load. If more than the specific maximum in weight is added to the pallet, it collapses and becomes unuseable. This aspect is quite desirable in the industry when an owner desires the return of his pallet after it is used to deliver goods to a consumer. If the consumer is unable to load more than a specific maximum on the pallet (usually the approximate weight of the deliver goods), he is often unable to use the pallet in his own plant and has no choice but to return the pallet to the owner.

As mentioned previously, it is possible to assemble the present pallet from formed or constructed parts but the preferred and most desirable method of construction is by injection molding. In this most preferred method an appropriately designed mold including several core members or preferably two collapsible core members is mounted on an injection molding machine which includes a plastic material supply apparatus such as an extruder. It has been found that foamed plastic material is the most desirable construction material for the present pallet. The process for molding foamed thermoplastic pallets comprises the steps of (a) melting and mixing a mixture of a blowing agent and a thermoplastic material in an extruder at a temperature and pressure above the foaming temperature and pressure of the mixture; (b) continuously extruding the mixture into an expanding accumulation zone in continuous communication with the extrude which zone expands at a rate substantially equal to the rate of extrusion while maintaining the mixture therein in the molten state and at a pressure above the foaming pressure thereof; (c) maintaining the pallet mold at a pressure no greater than the pressure at which the mixture foams and expands, and preferably at about atmospheric pressure; (d) establishing communication between the mold and the accumulation zone; (e) rapidly passing the mixture out of the accumulation zone and into the mold whereby the pressure differential between the accumulation zone and the mold causes the mixture to rapidly expand in the mold; and (f) terminating communication between the mold and the accumulation zone at a point when the accumulation zone is empty.

Improved apparatus suitable for carrying out the present process for molding foamed thermoplastic pallets comprises (a) extruder means adapted to melt, mix and continuously extrude a mixture of a blowing agent and a thermoplastic material at a temperature and pressure above the foaming temperature and pressure of the mixture; (b) an expandable accumulation chamber in continuous communication with the extruder adapted to receive the mixture from the extruder and expand at a rate substantially equal to the rate of extrusion and having means for maintaining the mixture therein in the molten state and at a pressure above the foaming pressure thereof; (c) a pallet mold adapted to be maintained at a pressure no greater than the pressure at which the mixture foams and expands and preferably at about a atmospheric pressure; (d) means for establishing and terminating communication between the mold and the accumulation chamber at a point where the pressure is above the foaming pressure of the mixture; (e) means for rapidly passing the mixture out of the accumulation chamber and into the mold when communication is established therebetween.

The foamed thermoplastic pallets produced in accordance with the invention have a total thickness of at least about three-sixteenths of an inch, a unique swirled or mottled surface and comprise a cellular core and a substantially noncellular, integral peripheral skin having a thickness of at least about 20 mils and are characterized by a degree of stiffness at least about five times as great as a completely noncellular article of the same thermoplastic material, total weight, and therefore, proportionally smaller size. The term "mottled surface" is intended to include surfaces having a dull or glossy mottled, woodlike or marbleized texture and/or appearance. A skin thickness of less than about 20 mils is not desirable because a fivefold increase in stiffness is not obtained.

Preferred foamed thermoplastic pallets produced in accordance with the present invention have the above-described mottled surface and a total thickness of at least about one-fourth of an inch and comprise a cellular core and a substantially noncellular, integral peripheral skin having a thickness of from about 15 to 80 thousandths of an inch and are characterized by a degree of stiffness at least about five times as great as a completely noncellular article of the same thermoplastic material, total weight and general shape. Skin thicknesses greater than about 110 mils are not preferred since they mitigate against the weight advantage gained in employing a foam core. The fivefold increase in stiffness of the pallets of the present invention provides a "structural foam" material having high strength characteristics but low weight. Also, the foamed articles of this invention are characterized by decreased heat conductivity and consequently increased insulation properties which are provided by the internal blowing agent cells.

The fivefold increase in stiffness and the increased ratio of rigidity to weight can substantially increase the economic feasibility of producing high strength plastic pallets by decreasing the amount of plastic required and consequently decreasing the weight of the article as well as the cost. A further economic advantage is realized in that reinforcing ribs need not be employed for strength thus very substantially decreasing the complexity and consequently, decreasing the cost of molds.

Unexpectedly, it has been found that the process of this invention not only produces a dense skin region and a cellular core region, but can also produce an isotropic product free of internal stresses and distortions even in molds of complex shape and thick sections at room temperature or less.

In one embodiment of this process, an accumulator device is provided which includes cylinder means having at one end thereof, communication means for the ingress of material into the cylinder from an extruder and for the egress of the material from the cylinder into a mold remote therefrom, and a piston reciprocally movable therein between a first position proximate said one end of the cylinder and a second position distant from said one end. Pressure means are also provided for applying force to the piston member in the direction of said one end. Associated with the cylinder means are valve means for establishing and terminating communication between a mold and the cylinder at a point remote from the mold and for forcing material between it and the mold into the mold. Advantageously, means are provided for automatically actuating the valve means. Further, the means can be responsive to the movement of the piston. Thus, when the piston is in the first position, the valve means can be actuated to terminate communication between the mold and the cylinder means, and when the piston is in its second position, the valve means are actuated to establish communication between the mold and cylinder means.

Thermoplastic polymeric materials in general can be molded according to the present process. Particularly preferred materials include high- and low-density polyethylene and polypropylene. Other suitable resins include ethylene-vinyl-acetate copolymers, rubber modified polypropylene, ethylene-propylene copolymers, crystalline polystyrene, high-impact polystyrene, acrylonitrile-butadiene-styrene polymers, vinyl resins, nylons, polyarylene polyethers, polyhydroxyether, polycarbonate, polysulfone, polyesters such as polyethylene terephthalate, cellulose esters and cellulose ethers such as cellulose acetate and cellulose acetate butyrate, and polyvinyl chloride.

The specific gravity of molded pallets may be varied from 0.4 to that of the solid resin but the best balance to toughness and stiffness is generally found in pallets that have a specific gravity range of 0.55 to 0.75.

The mixture employed in the process can also contain molding additives such as heat and light stabilizers, pigments, mold release agents, natural and synthetic fibers and slip agents. A conventional nucleating agent, such as calcium silicate, may be added to the mixture in order to enhance the uniformity of the cells produced by the foaming action. The ingredients of the mixture can be premixed, if desired, and charged to an extruder wherein the thermoplastic material is fluxed and mixed.

The blowing agent can be selected from chemical compounds such as azo, N-nitroso, carbonate and sulfonyl hydrazide compounds which are heat decomposable to yield a gas such as carbon dioxide or nitrogen. The blowing agent can also consist of normally gaseous agents such as methyl chloride, propylene, butylene and gaseous fluorocarbons, as well as gases such as nitrogen, carbon dioxide or air. Volatile liquids such as pentane, water and liquid fluorocarbons can also be employed in the foaming of the polymer.

While the various types of blowing agents which can be employed to produce a foamed product can be mixed with the plastic material at various stages in the process, it is advantageous to add liquid or gaseous agents directly to the polymeric material in the extruder, while the thermoplastic material is in a molten state in order to obtain a uniform dispersal of the agent within the molten plastic without employing additional mixing apparatus. Similarly, a decomposable chemical-blowing agent is advantageously premixed with the polymer prior to the charging of the polymer into the extruder.

Careful consideration should be given to the means of obtaining a homogeneous distribution of the decomposable chemical foaming agent in the plastic compound. This can be conveniently achieved by adding the foaming agent in the form of solid particles or in the form of a dispersion in a vehicle compatible with the basic resin. The mixing is then carried out in conventional equipment such as a churn, colloid mill, three-roll mill, or Banbury, the choice of which depends upon the viscosity of the plastic compound. Alternatively, to obtain uniform dispersion, pallets of plastic resin can be coated with the blowing agent by tumbling. Regardless of the method used, the foaming agent must be incorporated below its decomposition temperature to prevent the possibility of gas losses taking place in the plastic mass prior to expansion.

In the case of chemical-blowing agents premixed with the polymer the time-temperature relations within the extruder must be adequate to decompose the blowing agent to release the gas within the extruder. The extruder pressure must then be maintained uniformly high at least until the mixture is transferred into the high-pressure accumulator in order to prevent premature expansion of the cells.

The decomposition of the blowing agent can be delayed through the proper control of the extruder operating temperature and/or through the proper selection of the blowing agent. Thus, for example, diazoaminobenzene can be employed for decomposition at about 95° to 105° C. while azodicarbonamide can be employed for decomposition at the higher temperature range of 160° to 200° C.

The mixture being charged into the expanding zone must be maintained at a pressure above the foaming pressure thereof. While a pressure of as low as about 500 p.s.i. will normally prevent premature foaming of the mixture, pressures of at least 1,500 p.s.i. have been found to give best results. Pressures in excess of 10,000 p.s.i. are usually not required for proper operation of the accumulator device and normally should be avoided because operating expenses increase with increasing pressures.

In addition, the cylinder means is provided with heating means to maintain the mixture in the molten state and thus prevent solidification of thermoplastic material therein. It should be noted, however, that no heating of the mixture in the cylinder is required. Heat is applied to the mixture in the extruder and is only maintained in the cylinder.

The process of this invention is capable of rapidly and completely filling a pallet mold to produce a foamed plastic pallet which is substantially free of orientation and internal stresses (isotropic) comprising a foamed core and a substantially noncellular integral peripheral shell. Problems common to solid injection molding such as incomplete filling of the mold due to premature solidification of the thermoplastic material and high residual internal stresses due to flow resistance in the mold are not encountered. The results obtained with the present invention are believed to be a function of the desired weight of the finished foamed pallet, the temperature of the molten thermoplastic mixture, the amount of blowing agent in the mixture, the pressure required in the extruder and accumulation zone to prevent foaming of the mixture therein, mold temperature, and mold configuration. When the molten mixture in the accumulation zone, which is under a pressure greater than the foaming pressure thereof, is rapidly transferred to the mold, the pressure differential that exists between the accumulation zone and the mold causes the mixture to rapidly expand into a cellular mass, or in some instances, to explode into small cellular particles that fuse together in the mold, thereby rapidly filling the mold. Once the mold is initially filled with this cellular mass, more mixture is still entering the mold and its rapid expansion creates an outwardly acting pressure which forces the peripheral portion of the cellular mass against the surface of the mold thereby destroying its cell structure and forming a dense, noncellular peripheral skin having a thickness of at least about 20 mils surrounding a cellular core. The blowing gas that is expelled during the destruction of the peripheral cells is vented out through suitable openings in the mold such as the miter or parting line in a two part mold. Skin thickness is controlled by the temperature of the mixture and pressure employed in the extruder and accumulation zone. The presence of the internal cellular structure adds internal bracing to the opposed skin walls and increases the overall strength of the foamed plastic members.

The temperature of the mold is not critical. Cold molds, e.g. at room temperatures, about 20° C. can be used to produce foamed pallets having a dull mottled surface similar to the texture and appearance of wood. Lower mold temperatures are preferred since the time required for cooling the article in the mold is shorter. Higher mold temperatures permit more flow of the molten mixture in the mold prior to cooling than with a cooler mold and produce a smooth, glossy or glazed mottled surface.

Molds which cause sharp pressure drops to take place therein, due to a complex configuration, or sharp corners or the like, require the use of a greater amount and pressure of blowing agent in order to achieve a particular degree of foaming. The present pallet requires such a mold.

From the foregoing description, it is evident that the process and preferred apparatus of this invention can be employed to rapidly, efficiently, and automatically mold foamed thermoplastic pallets on a batch, semicontinuous or continuous basis.

It is to be understood that while the mixture in the accumulation zone is maintained at a substantially constant pressure, this pressure being greater than the pressure at which the blowing agent causes the foaming and expansion of the foamable material, pressures which would absolutely prevent foaming are unnecessary in the instant invention for minor bubbling is not significant and is not detrimental to the resultant product.

In the present process there are two forces driving the plastic material out of the accumulator. One is the direct pressure exerted by the accumulator and the other is the force of the gas expanding as it travels from the high pressure accumulator to the low pressure mold. Accumulator pressures are generally between 1,000 and 3,500 p.s.i. while the mold pressure is low since it is vented along the parting line. In one embodiment only enough solid plastic to fill about one-half of the mold is delivered by the accumulator, but since the solid plastic contains gas it expands and fills the mold with foam. As the foam flows through the mold the surface cells collapse and solid skins are formed. These skins are beneficial since the maximum tensile and compressive stresses occur on the surface when a member is subject to bending.

When the mold is not packed with solid plastic material, the pressures within the mold are low, in the range of 50 to 300 p.s.i., and aluminum, beryllium, copper or other metallic molds can be used. Aluminum molds remove heat from the foamed plastic about twice as fast as steel molds. Rapid heat removal is very important when cooling an insulating type of material.

It is within the spirit and scope of this invention to use screw-injection-type apparatus, such as that described in U.S. Pat. No. 3,124,841, in conjunction with means as described herein for establishing and terminating communication between the mold, the accumulation zone or chamber, and the extruder (screw). The accumulation zone or chamber is this instances is between the extrusion screw and the aforesaid means for establishing and terminating communication. It is also within the spirit and scope of the present invention to employ the methods and apparatus as disclosed in U.S. Pat. Nos. 3,268,636 and 3,436,446.

In one desirable embodiment of the present invention the exposed surfaces of the pallet are roughened in random fashion to increase the frictional properties of these surfaces. The roughened characteristic may be accomplished by roughening the surfaces of the pallet through an operation such as a blasting treatment or by roughening the surfaces of the mold by an operation such as a blasting treatment. One such acceptable blasting treatment is conventional sand blasting.

The phases "foaming pressure" and "foaming temperature" as used herein are defined as follows:

The phrase "foaming pressure" refers to the pressure at which an internally contained gas can produce substantial foaming and expansion of the plastic material within which it is contained.

The phrase "foaming temperature" refers to the temperature above which a solid or liquid blowing agent will become a gas at pressures less than the foaming pressure.

While this invention has been described in detail with particular reference to preferred embodiments thereof, it should be understood that variations and modifications can be effected within the spirit and scope of the invention as described hereinbefore and as defined in the appended claims.

I claim:

1. A double-face general purpose foamed thermoplastic pallet having a top deck lying within a substantially horizontal plane, said deck being composed of top deck members; a bottom deck lying within a substantially horizontal plane which is substantially parallel to the plane of the top deck; sidewalls lying within substantially parallel planes which are substantially vertical and normal to the planes of the top and bottom decks, said sidewalls being joined to the top and bottom decks and being sufficiently thin to offer no practical resisting moment to the termination of the top deck members by virtue of the thickness of the sidewalls; end walls which lie within substantially parallel planes which are substantially vertical and normal to both the top and bottom decks and the sidewalls, said end walls being joined to the top and bottom decks and said side and end walls each defining a pair of openings for the reception of forks or other transporting and handling equipment; internal center struts which lie in substantially parallel planes which are substantially vertical and normal to the top and bottom decks, said struts being joined to the top and bottom decks and defining a pair of spaced-apart passages within the interior of the pallet; and spacer plates which are disposed in substantially parallel planes which are substantially vertical and normal to the top and bottom decks and the center struts, said spacer plates being joined at the opposite ends thereof to the center struts to provide areas of static vertical support for the pallet and to cooperate with the center struts in defining the passages within the interior of the pallet.

2. A general purpose pallet as described in claim 1 wherein the top deck includes a pair of opposed top deck stringers which lie within the same horizontal plane as the top deck, said stringers being joined to the opposite ends of the top deck members; and a pair of top deck restrainer plates which lie within the same horizontal plane as the top deck, said restrainer plates being joined to the top deck members intermediate the ends of the top deck members.

3. A general purpose pallet as described in claim 2 including a pair of top deck cross braces which lie within the same horizontal plane as the top deck and are disposed parallel to the top deck restrainer plates, said cross braces being joined to the top deck members between the top deck restrainer plates and the top deck stringers.

4. A general purpose pallet as described in claim 1 wherein the elements of the pallet have a thickness of between three-sixteenths of an inch and 1 inch.

5. A general purpose pallet as described in claim 1 wherein the elements of the pallet have a thickness of between one-fourth of an inch and one-half of an inch and all the elements are of substantially the same thickness.

6. A general purpose pallet as described in claim 1 wherein the foamed plastic material has a cellular core and a noncellular skin with a thickness of at least about 20 mils.

7. A general purpose pallet as described in claim 1 wherein the pallet is of one integral piece construction and the plastic material skin provides the exterior surface for all elements of the pallet.

8. A general purpose pallet as described in claim 1 wherein the exposed surfaces of the pallet are roughened.

9. A double-face general purpose foamed thermoplastic pallet having a top deck lying within a substantially horizontal plane; a bottom deck lying within a substantially horizontal plane which is substantially parallel to the plane of the top deck; sidewalls lying within substantially parallel planes which are substantially vertical and normal to the planes of the top and bottom decks, said sidewalls each defining a pair of openings for the reception of forks or other transporting and handling equipment and being joined to the top and bottom decks and being sufficiently thin to offer no practical resisting moment to the termination of the top deck members by virtue of the thickness of the sidewalls; end walls which lie within substantially parallel planes which are substantially vertical and normal to both the top and bottom decks and the sidewalls, said end walls being joined to the top and bottom decks; internal center struts which are substantially vertical and normal to the top and bottom decks, said struts being joined to the top and bottom decks and defining a pair of spaced-apart passages within the interior of the pallet; and spacer plates which are substantially vertical and normal to the top and bottom decks and the center struts, said spacer plates being joined at the opposite ends thereof to the center struts to provide areas of static vertical support for the pallet and to cooperate with the center struts in defining the passages within the interior of the pallet.